United States Patent
Geiselhart et al.

(10) Patent No.: US 12,436,824 B2
(45) Date of Patent: Oct. 7, 2025

(54) CROWD-BASED INTELLIGENCE FOR COMPUTER MESSAGE ENHANCEMENT

(71) Applicant: International Business Machines Corporation, Armonk, NY (US)

(72) Inventors: Reinhold Geiselhart, Rottenburg (DE); Felix Beier, Haigerloch (DE); Knut Stolze, Hummelshain (DE); Luis Eduardo Oliveira Lizardo, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 18/171,814

(22) Filed: Feb. 21, 2023

(65) Prior Publication Data

US 2024/0281308 A1    Aug. 22, 2024

(51) Int. Cl.
*G06F 9/54* (2006.01)

(52) U.S. Cl.
CPC ................... *G06F 9/542* (2013.01)

(58) Field of Classification Search
CPC ................. G06F 9/542; G06F 9/451
See application file for complete search history.

(56) References Cited

U.S. PATENT DOCUMENTS

| | | | |
|---|---|---|---|
| 10,503,739 B2 | 12/2019 | Natkin et al. | |
| 11,429,682 B2 | 8/2022 | Haze et al. | |
| 2002/0159434 A1* | 10/2002 | Gosior | H04L 1/1685 370/336 |
| 2004/0186721 A1* | 9/2004 | Beynon | H04L 12/1831 704/275 |
| 2007/0189220 A1* | 8/2007 | Oberle | H04L 65/1104 370/331 |
| 2008/0032663 A1* | 2/2008 | Doyle | H04R 5/04 455/345 |
| 2008/0103757 A1* | 5/2008 | Washizawa | G06F 40/40 704/2 |
| 2009/0119564 A1* | 5/2009 | Sagfors | H04L 1/1854 714/748 |
| 2011/0075847 A1* | 3/2011 | Rossi | H04N 21/4623 380/279 |
| 2015/0205784 A1* | 7/2015 | Mese | H04L 51/216 704/9 |
| 2016/0321245 A1* | 11/2016 | Chisholm | G06F 40/58 |
| 2017/0083396 A1* | 3/2017 | Bishop | G06F 11/14 |
| 2018/0276202 A1* | 9/2018 | Baek | G06F 40/263 |
| 2019/0320409 A1 | 10/2019 | Dvorecki et al. | |
| 2020/0073936 A1* | 3/2020 | Jankowski | G06F 40/279 |
| 2020/0305097 A1* | 9/2020 | Bergquist | H04W 76/28 |

FOREIGN PATENT DOCUMENTS

CN    110795072 B    10/2021

* cited by examiner

*Primary Examiner* — Tuan C Dao
(74) *Attorney, Agent, or Firm* — Yee & Associates, P.C.

(57) ABSTRACT

Modifying original computer-generated messages is provided. An original computer-generated message is modified by at least one of replacing text or appending text of the original computer-generated message according to instructions located in a structure of a selected modification layer to form a modified computer-generated message corresponding to a current user-system context of a user of the computer system. The modified computer-generated message corresponding to the current user-system context of the user is output.

14 Claims, 9 Drawing Sheets

CROWD-BASED INTELLIGENCE FOR COMPUTER MESSAGE ENHANCEMENT

BACKGROUND

1. Field

The disclosure relates generally to computer-generated messages and more specifically to using crowd-based intelligence to modify original standard computer-generated messages in accordance with current user-system contexts.

2. Description of General Environment

A computer-generated message is information displayed on a computer screen that can appear unexpectedly to a user, and therefore unforeseen by the user, when an event or issue occurs. Computer systems typically display textual messages using dialog boxes. Generally, computer systems generate messages when, for example, a user-desired operation fails to execute, such as when access is denied, a device is not ready, a file is not found, or the like. In addition, computer systems generate messages to relay warnings or error messages, such as, for example, warning a user that the computer system is almost out of disk space, informing the user that the computer system is out of memory, informing the user that a program has stopped working on the computer system, and the like.

SUMMARY

According to one illustrative embodiment, a computer-implemented method for modifying original computer-generated messages is provided. A computer system modifies an original computer-generated message by at least one of replacing text or appending text of the original computer-generated message according to instructions located in a structure of a selected modification layer to form a modified computer-generated message corresponding to a current user-system context of a user of the computer system. The computer system outputs the modified computer-generated message corresponding to the current user-system context of the user. According to other illustrative embodiments, a computer system and computer program product for modifying original computer-generated messages are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
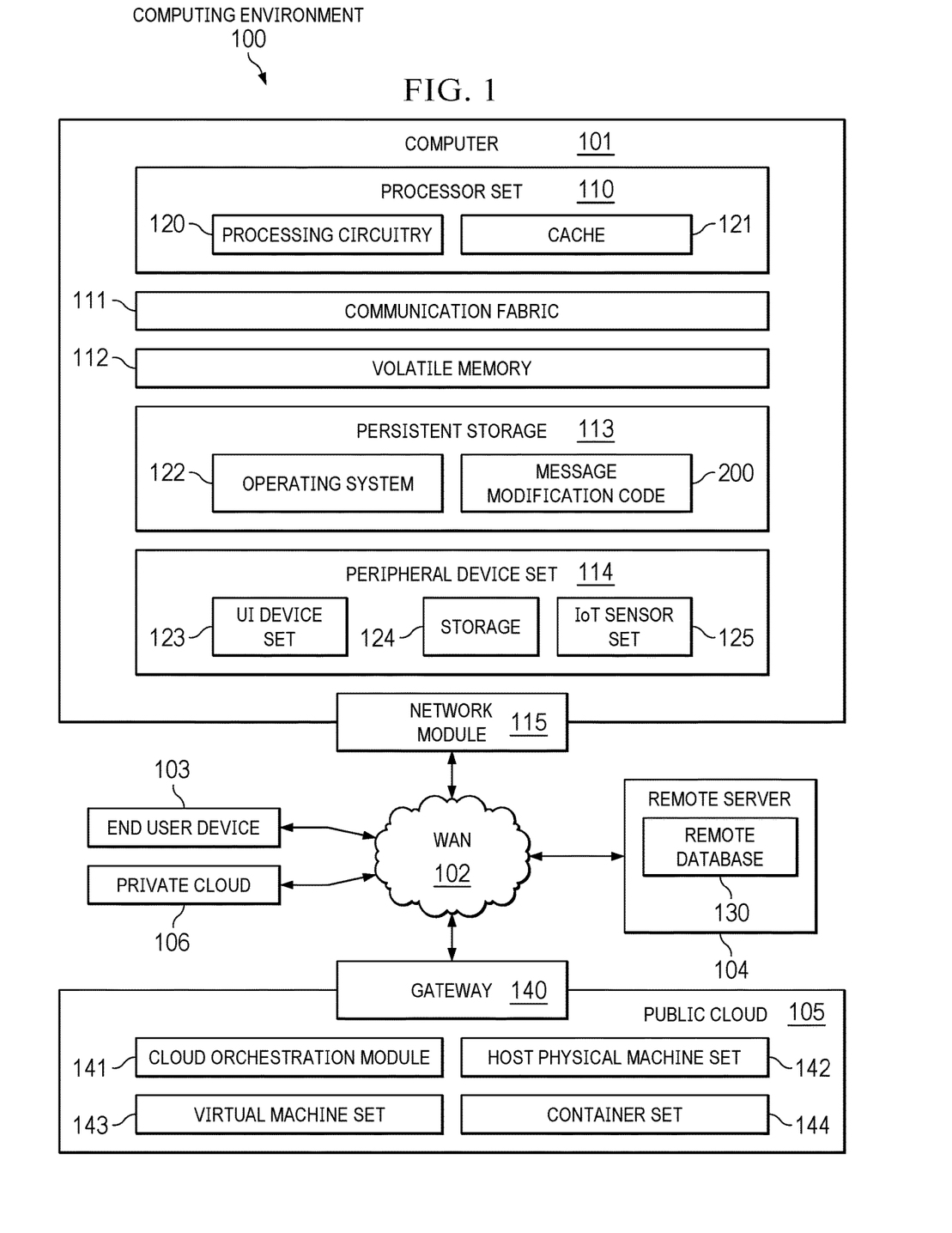
FIG. 1 is a pictorial representation of a computing environment in which illustrative embodiments may be implemented.
Figure 2:
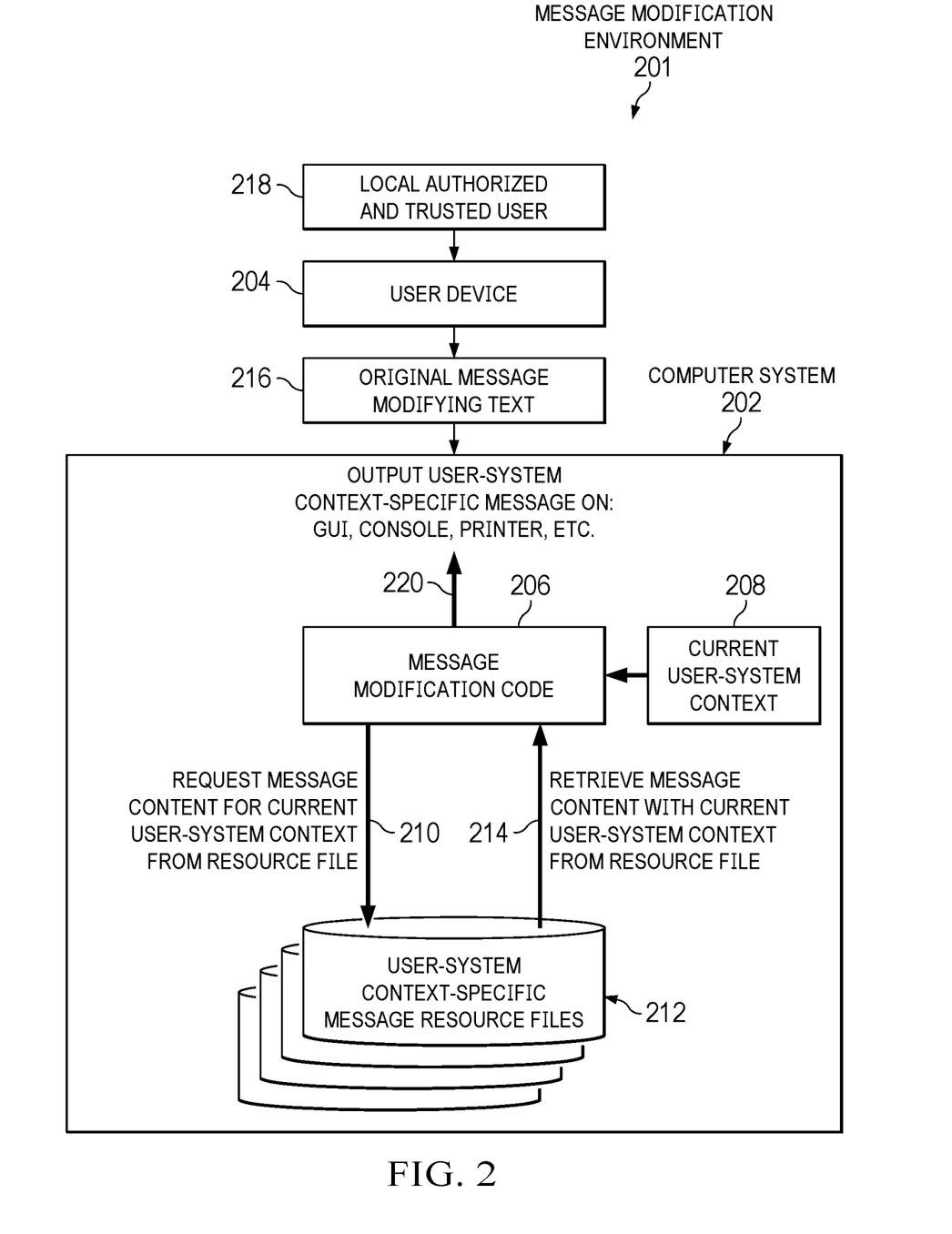
FIG. 2 is a diagram illustrating an example of a message modification environment in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as message modification code 200. Message modification code 200 modifies original standard computer-generated messages so that the modified computer-generated messages are tailored to individual needs of computer system users. Message modification code 200 performs this modification of original standard computer-generated messages automatically in real time. For example, message modification code 200 determines the current computer system context corresponding to a given user of the computer system (i.e., user-system context) to improve user understanding of a particular original standard computer-generated message by modifying that particular computer-generated message based on the current user-system context of that user. Message modification code 200 modifies the original standard computer-generated message, which is output or returned to the user, in accordance with the current user-system context and received input from at least one of a set of local users or a set of subject matter experts. A local user or subject matter expert is an authorized and trusted user, such as, for example, a system administrator, who is geographically located in a same local region or area as the computer system user. For example, the correct user interpretation of a particular computer-generated message is needed to reduce or eliminate possible consequences corresponding to wrong user reaction caused by an incorrect message interpretation by the computer system user. As a result, by message modification code 200 providing a real time modification of the original standard computer-generated message, which is tailored to the current user-system context, message modification code 200 benefits both the user and the computer system.

In addition to message modification code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and message modification code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in message modification code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The message modification code included in block 200 includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a local authorized and trusted user), and may take any of the forms discussed above in connection with computer 101. EUD 103 typically receives data from the operations of computer 101. For example, in a hypothetical case where computer 101 is designed to send a computer-generated message, which was triggered by user interaction or another event on computer 101, to an end user of EUD 103, this computer-generated message would typically be communicated from network module 115 of computer 101 through WAN 102 to EUD 103. In this way, EUD 103 can display, or otherwise present, the computer-generated message to the end user. In some embodiments, EUD 103 may be a client device, such as thin client, heavy client, mainframe computer, desktop computer, laptop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a message modification recommendation based on historical message modification data, then this historical message modification data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In addition to audible and optical indicators, computer systems generate textual messages to communicate with their users in many situations. Generally, these computer-generated messages are in a human readable form and, therefore, need to follow basic language rules regarding vocabulary, syntax, semantics, and the like. In other words, these computer-generated messages are language specific. Furthermore, depending on several user-specific factors and the context in which the user is interacting with the computer system, the user may interpret some predefined messages (e.g., messages predefined by the computer manufacturer) incorrectly or with meanings that were not intended.

For example, while a user is modifying a small amount of data on a computer system, the computer system may output a warning message, such as, for example, "File System Almost Full", "Low Disk Space", or the like. However, this warning message can have a completely different meaning to the user when the user is generating a large amount of data on the computer system because the user will most likely lose all or a portion of the data as a result of an insufficient amount of free storage space to persist the data on the computer system. In this situation, it would be beneficial to the user if the warning message would also direct the user to contact a system administrator immediately to correct the issue of insufficient free storage space before continuing to generate more data. In other words, in this situation, by the computer system generating a more specific warning message, data loss could be prevented.

As another example, the international market for computer systems creates a need for "globalization" and "language translation". This means that for each respective language, the computer manufacturer should provide, test, and maintain an additional set of translated messages. Due to the cost of providing the additional sets of translated messages, many computer manufacturers defer message translation to web-based services, which translate standard single-language messages that are typically in English to other languages. This is convenient for computer manufacturers, as these computer manufacturers can then claim that their products support many different languages without the additional cost.

However, because of possible suboptimal message translation by such web-based services, some computer messages may be converted into confusing or misleading fragments, which may not make sense to a user of the computer system. As a result, when a computer system only provides limited language translation support and utilizes a web-based message translation service to bridge the gap, then the results can often be suboptimal. Thus, it would be beneficial if there was a way to "overwrite" or modify a confusing or misleading computer message and then use the modified computer message as a permanent replacement. For example, a local user or subject matter expert could modify the confusing or misleading computer message so that the computer system user could understand the computer message. Then, this modified computer message could be stored persistently and returned on behalf of the suboptimal computer message in the future.

As a further example, some database analytics software provide a warning message when a database system determines that an executed query statement is suboptimal. The database administrator (e.g., subject matter expert who is authorized and trusted) has specific knowledge regarding the database system and can utilize this specific knowledge to modify or augment this warning message to provide additional information to the user who executed that particular query statement. For example, if the user who executed the query statement is in another department and does not have detailed knowledge about the database system, then in this situation the database administrator could add useful information to the warning message (e.g., which specific application the user should check to determine whether statistics were collected for the affected table). The information added to the warning message by the database administrator can also include, for example, instructions for optimizing the query statement based on the specific knowledge of that particular database system by the database administrator and any experience as to which query optimizations have proven to be useful in the past to the database administrator.

In the examples above, computer manufacturers are limited to foresee or anticipate all the different contexts in which computer messages are output to users of their computer systems. Further, these computer manufacturers have no way to foresee the impact or consequences these computer messages may have on their users. Illustrative embodiments utilize crowd-based intelligence to enhance computer messages in the field. This computer message enhancement by illustrative embodiments contrasts with predefined computer messages and web-based computer message translations, which cannot foresee or anticipate the actual user-system context when a computer system outputs a particular computer message to a user.

Current "globalization" standards for computer systems require computer-generated messages to be uniquely identifiable in dedicated resource files as opposed to hard-coded messages in software source code, which should not occur anymore. This dedicated resource file is a one-dimensional list, which is referenced by unique message identifiers, such as numbers. For example, the one-dimensional list may include a listing of unique identifying numbers followed by predefined textual computer messages, such as [0001] "message ABC", [0002] "message DEF", [0003] "message LMN", [0004] "message XYZ", [0005] "message @*$", and so on.

A computer system first determines that a particular computer message should be output to the computer system user. Afterward, the computer system identifies a location of that particular message within the one-dimensional list using the message's unique identifier and then retrieves that particular message from the one-dimensional list. Subsequently, the computer system outputs that particular message to the user via, for example, a user interface, printer, or the like. One issue with this current approach is that if the outputted computer message is incorrect or misleading for the current situation, then a service ticket is typically opened against the computer manufacturer and, if accepted by the computer manufacturer, the computer manufacturer releases a software correction to the field at some point in time in the future.

Illustrative embodiments identify and utilize a user-system context, which is a group of information elements that describes a current state and situation of a given user in relation to and interaction with a particular computer system. The user-system context includes user-specific information elements and computer system-specific information elements. The user-specific information elements include, for example: preferred language of the user; role of the user, such as editor, author, reader, local administrator, department manager, or the like, when utilizing the computer system; assigned computer system permissions corresponding to the user, such as permission to perform certain tasks on the computer system, access secure applications and data on the computer system, or the like; list of recent computer system activities performed by the user, such as created large amounts of data on the computer system, started certain projects on the computer system, modified certain data partitions on the computer system; has a significant amount of unused storage space on the computer system; is working with specific resources and data on the computer system; and the like. The computer system-specific information elements include, for example: current overall load of the computer system; current user of the computer system; current status of computer system resources, such as processors, memory, storage, input/output channels, and the like; current computer system response times; current running applications on the computer system; computer system scheduled outages, maintenance times, and actions to be performed; and the like. The computer system can collect and store the user-specific information elements and computer system-specific information elements in a user profile and system profile, respectively.

Furthermore, illustrative embodiments expand or build on an original one-dimensional list of standard computer messages to generate a multi-dimensional structure comprised of a set of modification layers above the original one-dimensional list forming a hierarchy of layers. It should be noted that the original one-dimensional list of standard computer messages provided by the computer manufacturer is a base layer or ground state for illustrative embodiments, which means that each original computer message exists in the original one-dimensional list and all overlaying modification layers are optional (e.g., no additional modification layers currently exist). In that situation where no additional modification layers exist, illustrative embodiments select the original computer message to output to the user.

Illustrative embodiments start with the original one-dimensional list of computer messages as a base layer and then add modification layers on top of the base layer corresponding to the original one-dimensional list of computer messages. Illustrative embodiments determine the number of additional modification layers above the base layer of the original one-dimensional list of computer messages based on the number of user-system context information elements detected, the number of different combinations of these detected user-system context information elements, and the number of message enhancements per modification layer. For each user-system context information element detected and combinations of user-system context information elements, illustrative embodiments provide at least one of a set of specific message enhancements or a set of specific message replacements that impacts user understanding of the computer message, which is output to that particular user. For this, illustrative embodiments define a unique hierarchical precedence and message modification strategy.

For each combination of user-system context information elements, a local authorized and trusted user can define a set of specific message enhancements (i.e., text that is appended to the original standard computer message) or a specific set of message replacements (i.e., the original message text is totally replaced with new text). In addition, the new message structure of illustrative embodiments includes a priority field that indicates whether illustrative embodiments are to process a particular message layer normally ("N") or as high priority ("P"). Illustrative embodiments process a high priority layer last to override modifications by all other layers in the multi-dimensional structure. In other words, in response to the priority field being set to "P" for a particular modification layer, illustrative embodiments change the processing flow of the multi-dimensional structure. For example, if the user sets the base layer of original standard messages as high priority, then illustrative embodiments will not make any message modifications corresponding to any added modification layers of the multi-dimensional structure. The priority field is helpful when certain computer messages should only be in effect temporarily, without losing the "normal" configuration.

Thus, illustrative embodiments provide one or more technical solutions that overcome a technical problem with user misinterpretation of important computer-generated messages. As a result, these one or more technical solutions provide a technical effect and practical application in the field of computer-generated messages.

With reference now to FIG. 2, a diagram illustrating an example of a message modification environment is depicted in accordance with an illustrative embodiment. Message modification environment 201 may be implemented in a computing environment, such as computing environment 100 in FIG. 1. Message modification environment 201 is a system of hardware and software components for using crowd-based intelligence to modify original standard computer-generated messages in accordance with current user-system contexts.

In this example, message modification environment 201 includes computer system 202 and user device 204. Computer system 202 and user device 204 may be, for example, computer 101 and EUD 103 in FIG. 1. However, it should be noted that message modification environment 201 is intended as an example only and not as a limitation on illustrative embodiments. For example, message modification environment 201 can include any number of computer systems, user devices, and other devices and components not shown.

Computer system 202 includes message modification code 206, such as, for example, message modification code 200 in FIG. 1. Message modification code 206 controls the process of modifying triggered original standard computer-generated messages, which are provided by the manufacturer of computer system 202, in accordance with current user-system context 208.

At 210, message modification code 206 requests message content corresponding to the triggered original standard computer-generated message for current user-system context 208 from user-system context-specific message resource files 212. At 214, message modification code 206 receives the message content corresponding to the triggered original standard computer-generated message with current user-system context 208 from user-system context-specific message resource files 212. In addition, message modification code 206 receives original standard computer-generated modifying text 216 as input from local authorized and trusted user 218 via user device 204 to modify the triggered original standard computer-generated message in accordance with current user-system context 208. Original standard computer-generated modifying text 216 is at least one of replacement text or additional explanatory or instructive text. At 220, message modification code 206 outputs the user-system context-specific message on, for example, a graphical user interface, console, printer, or the like.

Figure 3:
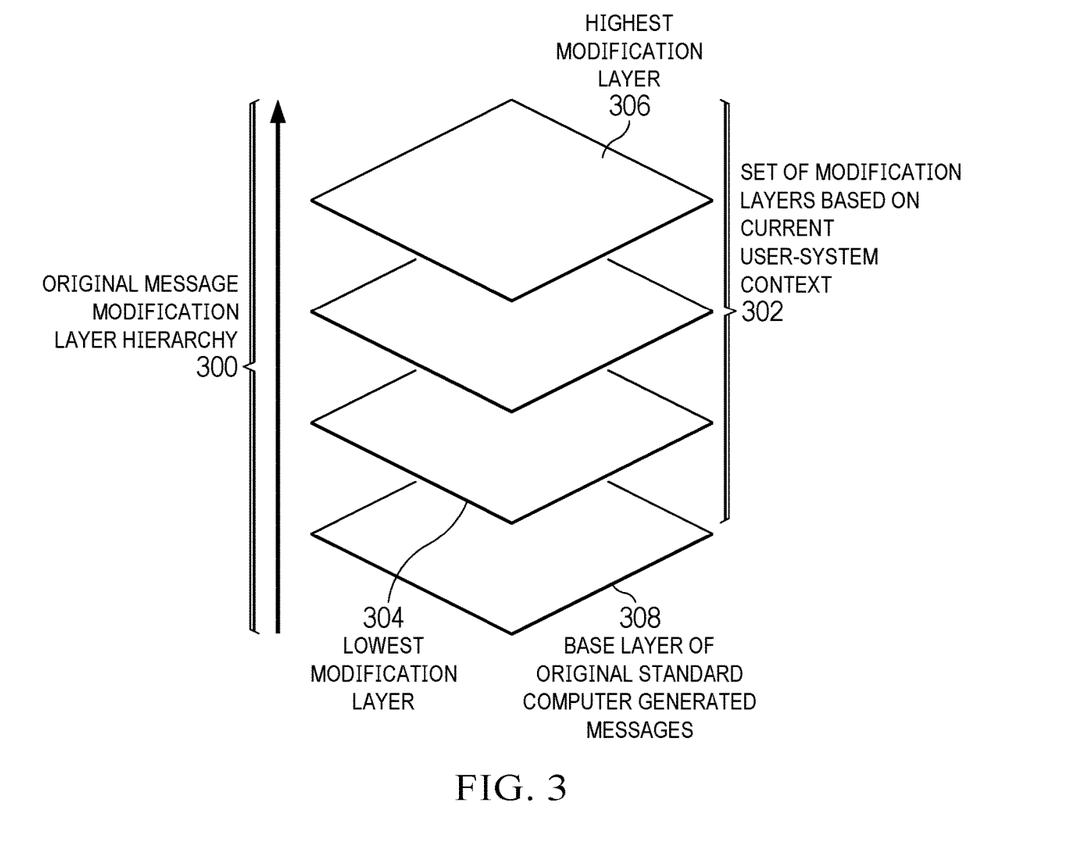
FIG. 3 is a diagram illustrating an example of an original message modification layer hierarchy in accordance with an illustrative embodiment.

With reference now to FIG. 3, a diagram illustrating an example of an original message modification layer hierarchy is depicted in accordance with an illustrative embodiment. Original message modification layer hierarchy 300 is comprised of set of modification layers 302, which is based on a current user-system context, such as, for example, current user-system context 208 in FIG. 2. However, it should be noted that original message modification layer hierarchy 300 is intended as an example only and not as a limitation on illustrative embodiments. For example, set of modification layers 302, which comprises original message modification layer hierarchy 300, can include 1, 2, 3, 4, 5, or any number of modification layers. Further, original message modification layer hierarchy 300 includes lowest modification layer 304 and highest modification layer 306.

Message modification code, such as, for example, message modification code 200 in FIG. 1 or message modification code 206 in FIG. 2, generates set of modification layers 302. The message modification code places set of modification layers 302 to form original message modification layer hierarchy 300 above base layer 308. Base layer 308 is comprised of original standard computer-generated messages, which are provided by the computer system manufacturer. When modifying a particular triggered original standard computer-generated message in base layer 308, the message modification code starts modifying that particular triggered original standard computer-generated message with lowest modification layer 304 of set of modification layers 302 and finishes modifying that particular triggered original standard computer-generated message with highest modification layer 306.

Figure 4:
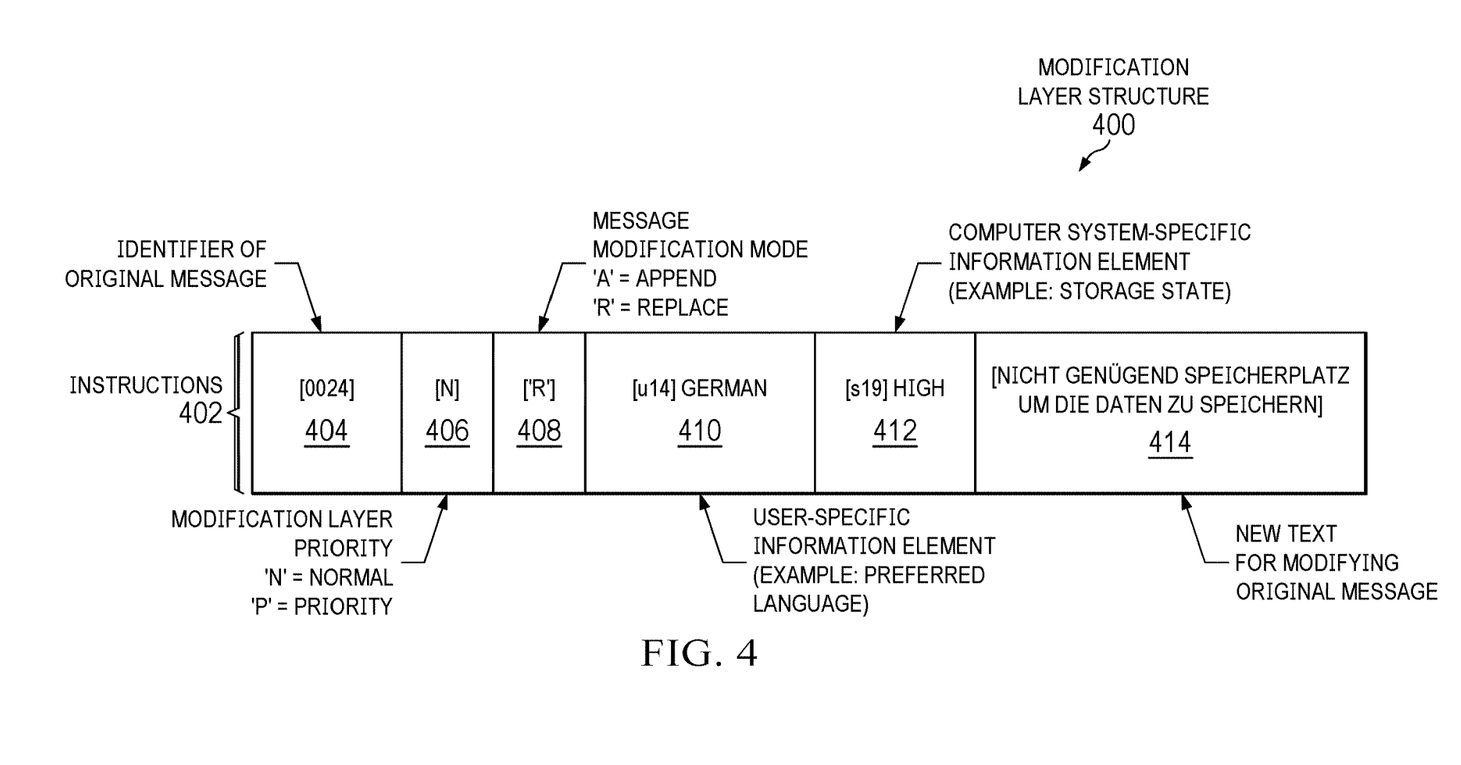
FIG. 4 is a diagram illustrating a modification layer structure in accordance with an illustrative embodiment.

With reference now to FIG. 4, a diagram illustrating a modification layer structure is depicted in accordance with an illustrative embodiment. Modification layer structure 400 includes instructions 402. Instructions 402 correspond to a particular modification layer of a set of modification layers, such as, for example, set of modification layers 302 in FIG. 3. Instructions 402 direct message modification code, such as, for example, message modification code 200 in FIG. 1 or message modification code 206 in FIG. 2, how to modify a triggered original standard computer-generated message.

In this example, instructions 402 include instruction 404, instruction 406, instruction 408, instruction 410, instruction 412, and instruction 414. Instruction 404 provides an identifier of the triggered original standard computer-generated message. Instruction 406 indicates whether the message modification code is to process that particular modification layer normally ("N") or with priority ("P"). Instruction 408 indicates a message modification mode. For example, instruction 408 directs the message modification code to one of append ("A") text to the triggered original standard computer-generated message or replace ("R") text of the triggered original standard computer-generated message.

Instruction 410 provides a user-specific information element corresponding to the current user-system context. In this example, the user-specific information element indicates the computer system user's preferred language (e.g., German). Instruction 412 provides a computer system-specific information element corresponding to the current user-system context. In this example, the computer system-specific information element indicates the computer system's storage state (e.g., High). Instruction 414 provide new text for modifying the triggered original standard computer-generated message. In this example, the new text for modifying the triggered original standard computer-generated message is translated into the computer system user's preferred language of German.

Figure 5:
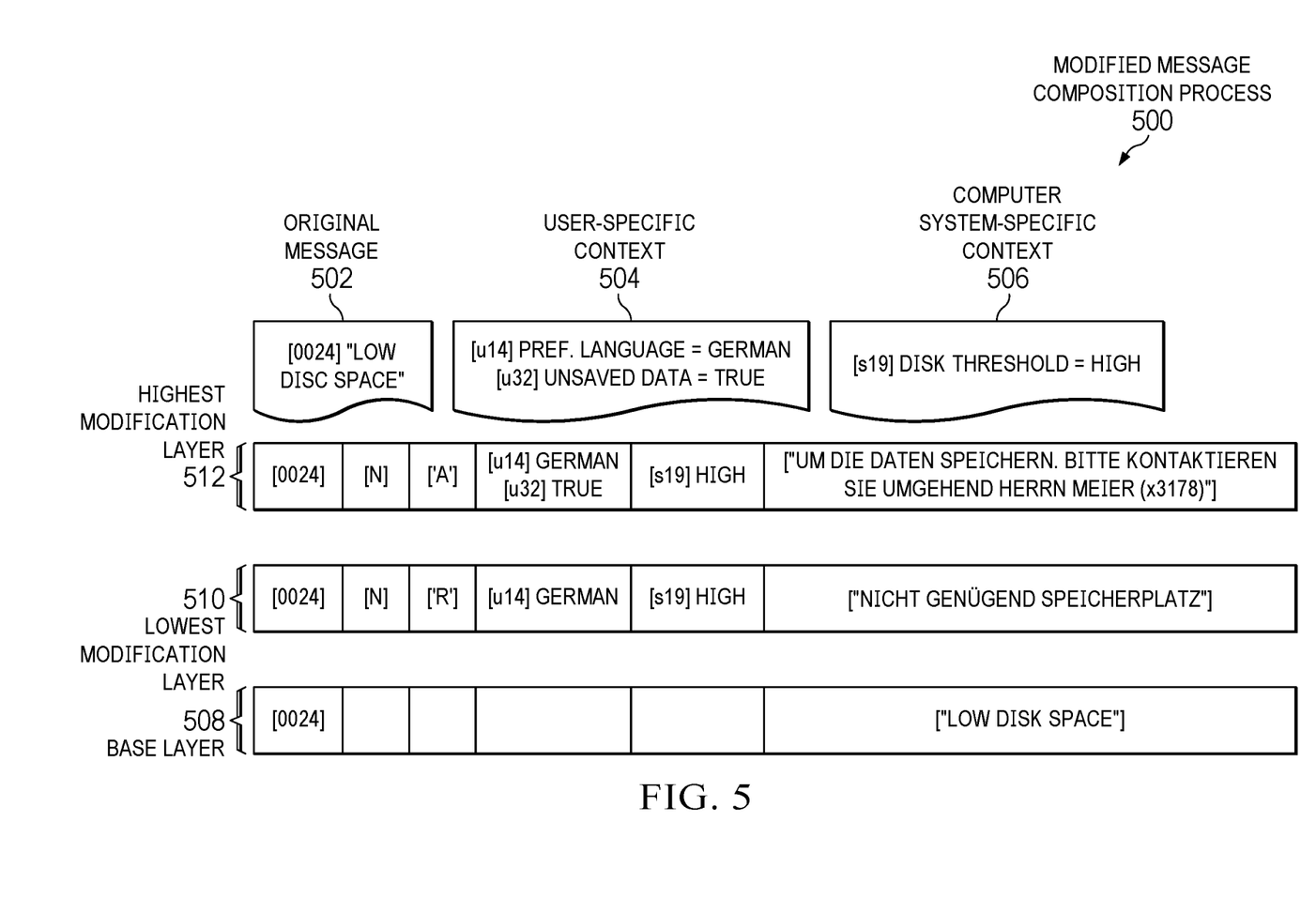
FIG. 5 is a diagram illustrating an example of a modified message composition process in accordance with an illustrative embodiment.

With reference now to FIG. 5, a diagram illustrating an example of a modified message composition process is depicted in accordance with an illustrative embodiment. Modified message composition process 500 can be implemented in message modification code, such as, for example, message modification code 200 in FIG. 1 or message modification code 206 in FIG. 2.

The message modification code starts with original standard computer-generated message 502. In this example, original standard computer-generated message 502 is "Low Disk Space", which the message modification code locates using unique message identifier [0024]. The message modification code modifies original standard computer-generated message 502 in accordance with user-specific context 504 and computer system-specific context 506. In this example, user-specific context 504 indicates that the preferred language is equal to German and that unsaved data is equal to true. In addition, computer system-specific context 506 indicates that disk threshold is equal to high.

When modifying the triggered original standard computer-generated message, the message modification code first starts with base layer 508, which contains the triggered original standard computer-generated message (e.g., "Low Disk Space"). Then, the message modification code processes lowest modification layer 510 directly above base layer 508. Lowest modification layer 510 instructs the message modification code to replace the original message "Low Disk Space" with German translation "Nicht genügend Speicherplatz", which a local authorized and trusted user provided. If a web-based translation service were used to translate the original message, then a suboptimal message may be returned, such as, for example, "Niedrige Scheibe Raum", which some users may not understand.

Afterward, the message modification code processes highest modification layer 512 above lowest modification layer 510. Highest modification layer 512 instructs the message modification code to append additional text since user-specific context 504 and computer system-specific context 506 indicate in that moment the user can lose data when proceeding without system administrator intervention. As a result, the message modification code, using highest modification layer 512, modifies original message "Low Disk Space" to "not sufficient to save your data. Please contact Mr. Meier immediately (x3178)" and then translates the modified original message to German, which is "um die Daten zu speichern. Bitte kontaktieren sie umgehend Herrn Meier (x3178)".

Figure 6:
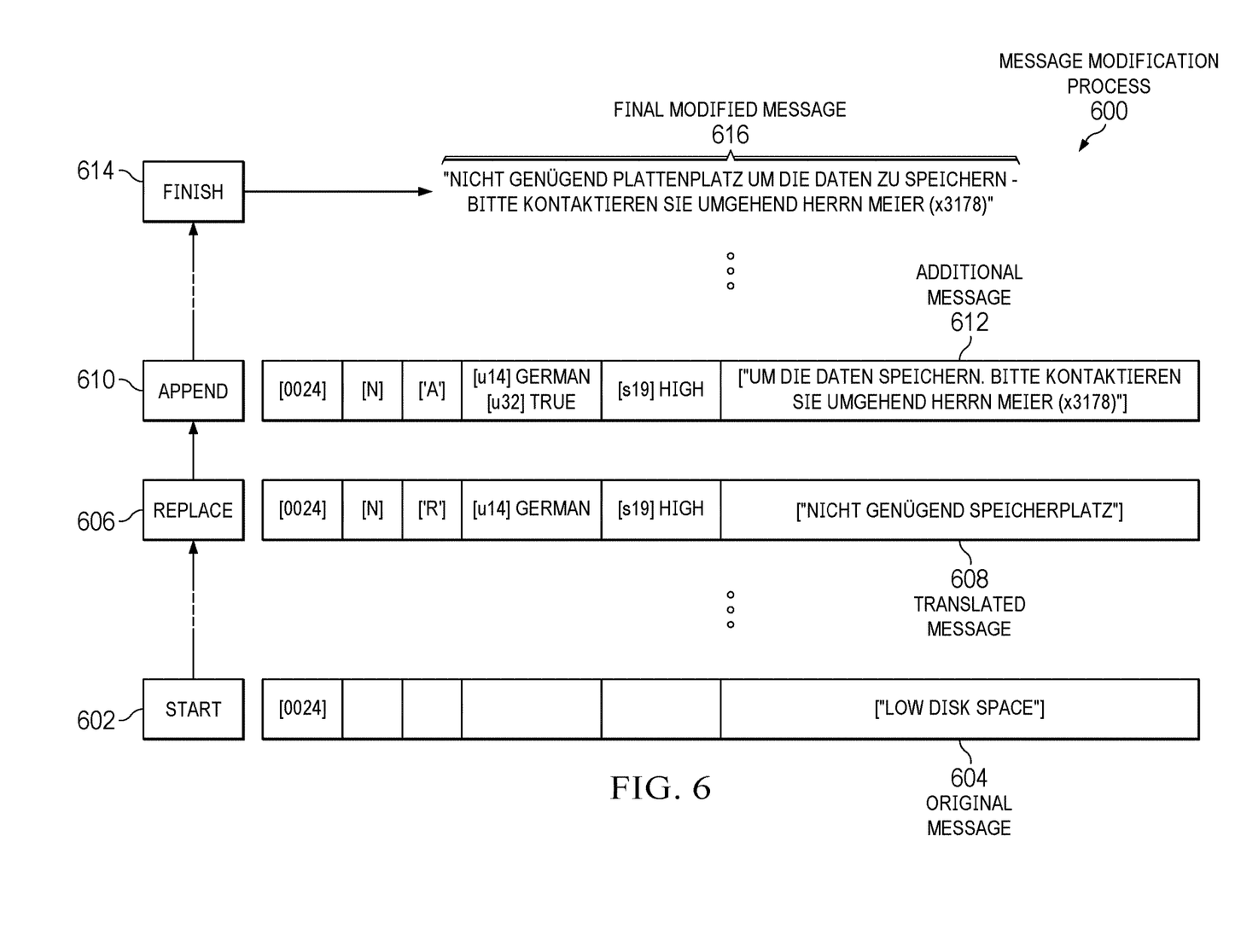
FIG. 6 is a diagram illustrating an example of a message modification process in accordance with an illustrative embodiment.

With reference now to FIG. 6, a diagram illustrating an example of a message modification process is depicted in accordance with an illustrative embodiment. Message modification process 600 can be implemented in message modification code, such as, for example, message modification code 200 in FIG. 1 or message modification code 206 in FIG. 2. During runtime, the message modification code scans through all the layers of the multi-dimensional structure to generate the final modified message to be submitted to the user in accordance with the current user-system context. The current user-system context may be, for example, current user-system context 208 in FIG. 2 or user-specific context 504 and computer system-specific context 506 in FIG. 5.

At 602, the message modification code starts with original message 604, which corresponds to a base layer of the multi-dimensional structure, such as base layer 308 in FIG. 3 or base layer 508 in FIG. 5. Then, at 606, the message modification code replaces original message 604 with translated message 608, which can correspond to a lowest modification layer of the multi-dimensional structure, such as lowest modification layer 304 in FIG. 3 or lowest modification layer 510 in FIG. 5. Afterward, at 610, the message modification code appends translated message 608 with additional message 612, which can correspond to a highest modification layer of the multi-dimensional structure, such as highest modification layer 306 in FIG. 3 or highest modification layer 512 in FIG. 5. Subsequently, at 614, the message modification code finishes with final modified message 616, which the message modification code outputs to the user.

Figure 7A:
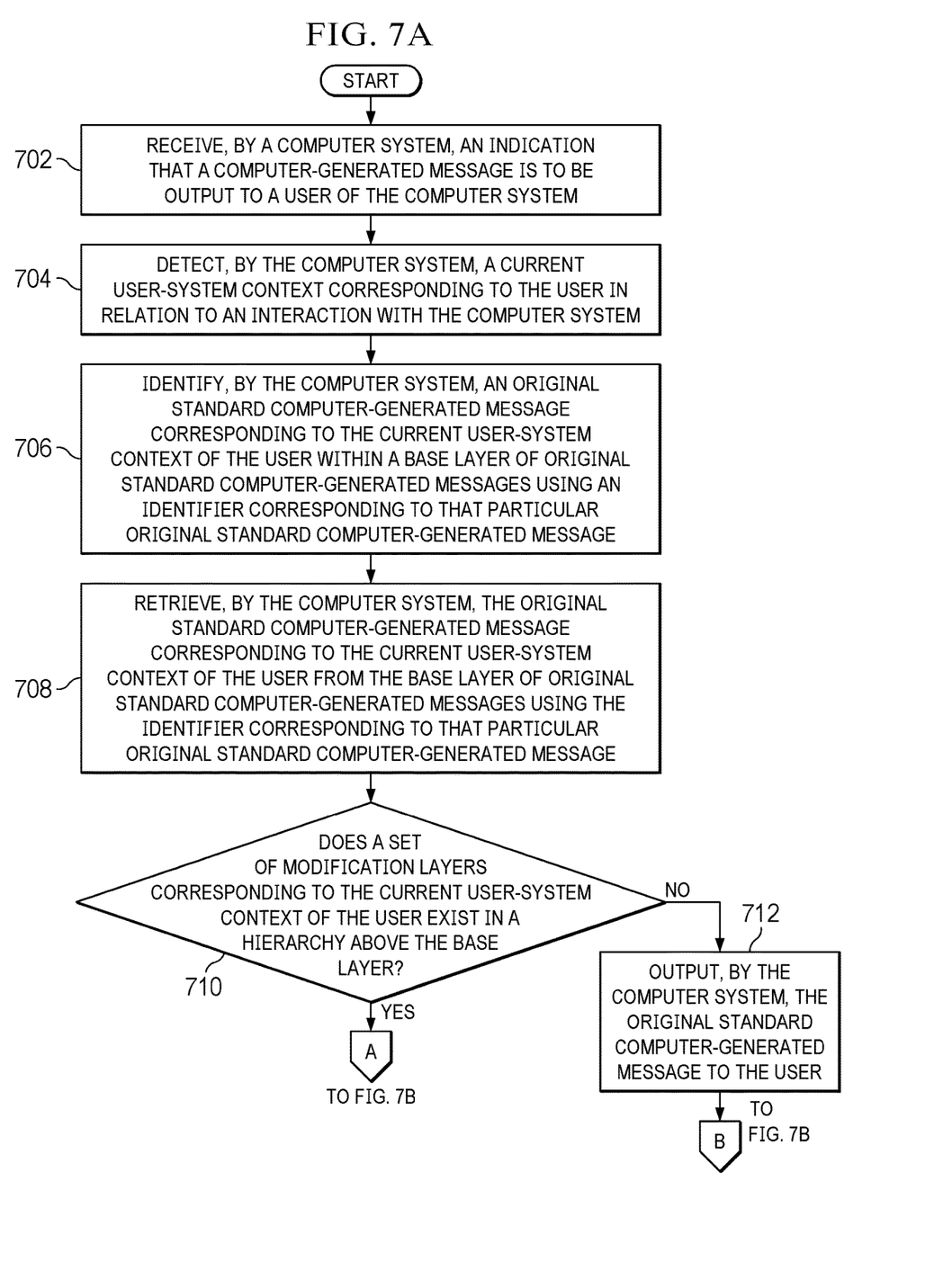
FIGS. 7A-7B are a flowchart illustrating a process for modifying original standard computer-generated messages in accordance with an illustrative embodiment.
Figure 7B:
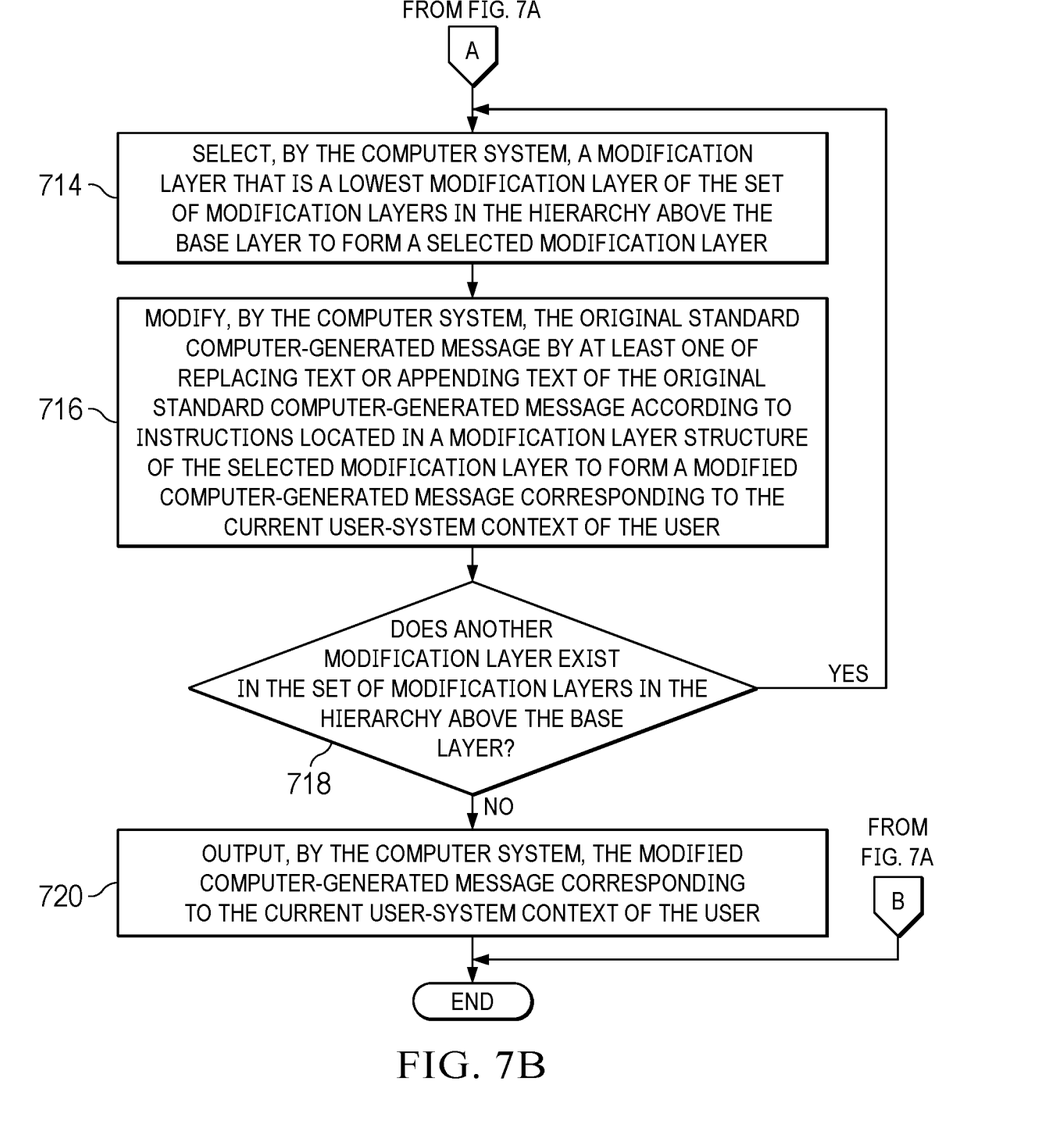

With reference now to FIGS. 7A-7B, a flowchart illustrating a process for modifying original standard computer-generated messages is shown in accordance with an illustrative embodiment. The process shown in FIGS. 7A-7B may be implemented in a computer system, such as, for example, computer 101 in FIG. 1 or computer system 202 in FIG. 2. For example, the process shown in FIGS. 7A-7B may be implemented in message modification code 200 in FIG. 1 or message modification code 206 in FIG. 1.

The process begins when the computer system receives an indication that a computer-generated message is to be output to a user of the computer system (step 702). The computer system detects a current user-system context corresponding to the user in relation to and interaction with the computer system in response to receiving the indication (step 704).

The computer system identifies an original standard computer-generated message corresponding to the current user-system context of the user within a base layer of original standard computer-generated messages using an identifier corresponding to that particular original standard computer-generated message (step 706). The computer system retrieves the original standard computer-generated message corresponding to the current user-system context of the user from the base layer of original standard computer-generated messages using the identifier corresponding to that particular original standard computer-generated message (step 708).

The computer system makes a determination as to whether a set of modification layers corresponding to the current user-system context of the user exists in a hierarchy above the base layer (step 710). If the computer system determines that a set of modification layers corresponding to the current user-system context of the user does not exist in a hierarchy above the base layer, no output of step 710, then the computer system outputs the original standard computer-generated message to the user (step 712). Thereafter, the process terminates. If the computer system determines that a set of modification layers corresponding to the current user-system context of the user does exist in a hierarchy above the base layer, yes output of step 710, then the computer system selects a modification layer that is a lowest modification layer of the set of modification layers in the hierarchy above the base layer to form a selected modification layer (step 714).

The computer system modifies the original standard computer-generated message by at least one of replacing text or appending text of the original standard computer-generated message according to instructions located in a modification layer structure of the selected modification layer to form a modified computer-generated message corresponding to the current user-system context of the user (step 716). Afterward, the computer makes a determination as to whether another modification layer exists in the set of modification layers in the hierarchy above the base layer (step 718). If the computer determines that another modification layer does exist in the set of modification layers in the hierarchy above the base layer, yes output of step 718, then the process returns to step 714 where the computer selects a next modification layer in the hierarchy. If the computer determines that another modification layer does not exist in the set of modification layers in the hierarchy above the base layer, no output of step 718, then the computer system outputs the modified computer-generated message corresponding to the current user-system context of the user (step 720). Thereafter, the process terminates.

Figure 8:
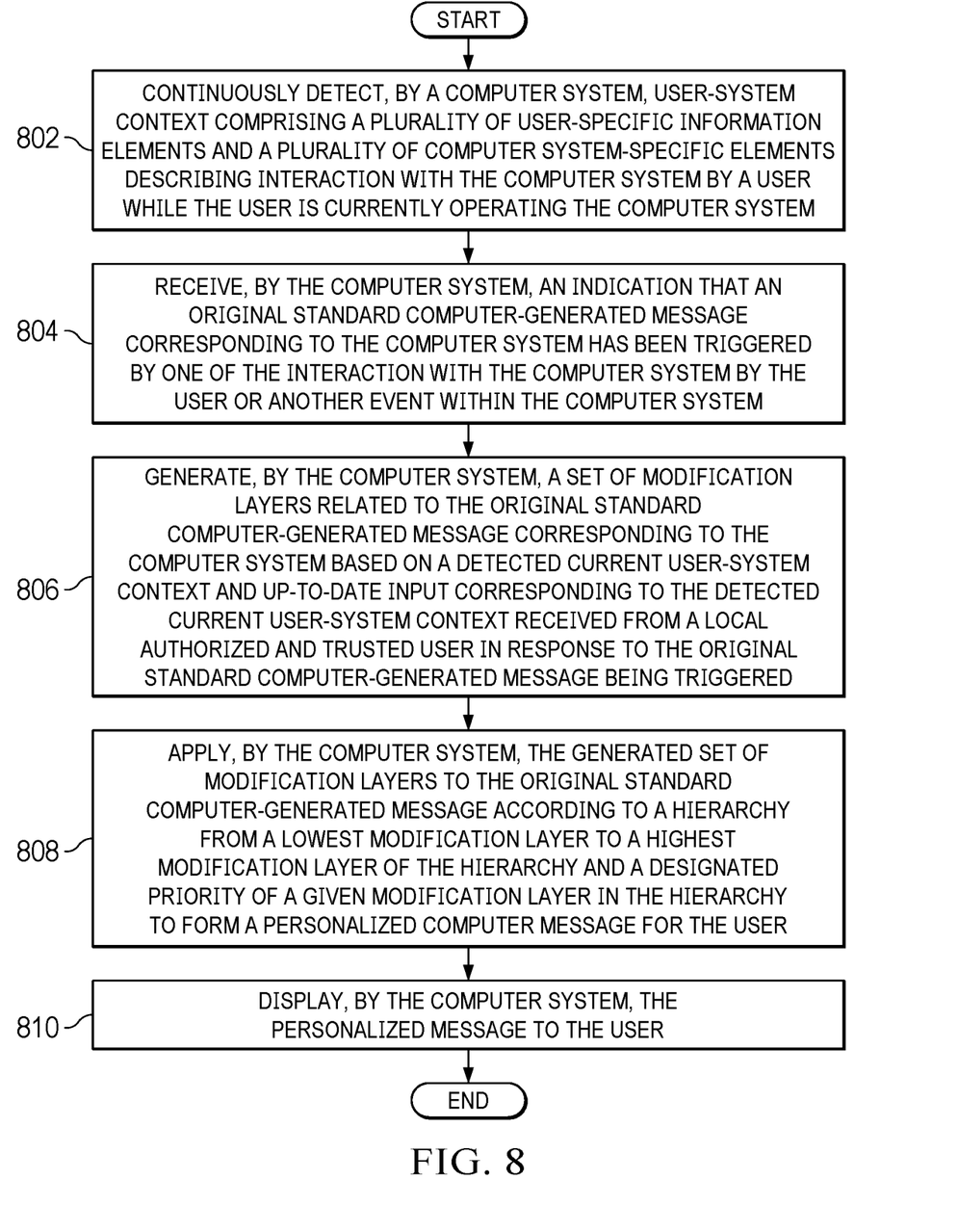
FIG. 8 is a flowchart illustrating a process for applying generated modification layers to original standard computer-generated messages in accordance with an illustrative embodiment.

With reference now to FIG. 8, a flowchart illustrating a process for applying generated modification layers to original standard computer-generated messages is shown in accordance with an illustrative embodiment. The process shown in FIG. 8 may be implemented in a computer system, such as, for example, computer 101 in FIG. 1 or computer system 202 in FIG. 2. For example, the process shown in FIG. 8 may be implemented in message modification code 200 in FIG. 1 or message modification code 206 in FIG. 1.

The process begins when the computer system continuously detects user-system context comprising a plurality of user-specific information elements and a plurality of computer system-specific elements describing interaction with the computer system by a user while the user is currently operating the computer system (step 802). Subsequently, the computer system receives an indication that an original standard computer-generated message corresponding to the computer system has been triggered by one of the interaction with the computer system by the user or another event within the computer system (step 804).

The computer system generates a set of modification layers related to the original standard computer-generated message corresponding to the computer system based on a detected current user-system context and up-to-date input corresponding to the detected current user-system context received from a local authorized and trusted user in response to the original standard computer-generated message being triggered (step 806). The computer system applies the generated set of modification layers to the original standard computer-generated message according to a hierarchy from a lowest modification layer to a highest modification layer of the hierarchy and a designated priority of a given modification layer in the hierarchy to form a personalized computer message for the user (step 808). The computer system displays the personalized message to the user (step 810). Thereafter, the process terminates.

Thus, illustrative embodiments of the present invention provide a computer-implemented method, computer system, and computer program product for using crowd-based intelligence to modify original standard computer-generated messages in accordance with current user-system contexts. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modifying original computer-generated messages, the computer-implemented method comprising:
   generating, by a computer system, a computer-generated message triggered by an event within the computer system during runtime regarding an issue with operation of the computer system;
   detecting, by the computer system, a current user-system context of the computer system in relation to the issue with the operation of the computer system during runtime in response to generating the computer-generated message triggered by the event within the computer system;
   identifying, by the computer system, the computer-generated message corresponding to the current user-system context of the computer system within a base layer of original computer-generated messages in the computer system using an identifier corresponding to the computer-generated message;
   determining, by the computer system, whether a set of modification layers corresponding to the current user-system context of the computer system exists in a hierarchy above the base layer of the original computer-generated messages;
   selecting, by the computer system, a modification layer that is a lowest modification layer of the set of modification layers in the hierarchy above the base layer to form a selected modification layer in response to the computer system determining that the set of modification layers corresponding to the current user-system context of the computer system does exist in the hierarchy above the base layer;
   modifying, by the computer system, the computer-generated message by at least one of replacing text or appending text of the computer-generated message according to instructions located in a structure of the selected modification layer to form a modified computer-generated message corresponding to the current user-system context of the computer system; and
   outputting, by the computer system, the modified computer-generated message corresponding to the current user-system context of the computer system to a user.

2. The computer-implemented method of claim 1, further comprising:
   outputting, by the computer system, the computer-generated message to the user in response to the computer system determining that a set of modification layers corresponding to the current user-system context of the computer system does not exist in a hierarchy above the base layer.

3. The computer-implemented method of claim 1, further comprising:
   detecting, by the computer system, user-system context continuously, the user-system context comprising a plurality of user-specific information elements and a plurality of computer system-specific information elements, wherein the plurality of user-specific information elements includes preferred language of the user, role of the user when utilizing the computer system, assigned computer system permissions corresponding to the user, and list of recent computer system activities performed by the user, and wherein the plurality of computer system-specific information elements includes current overall load of the computer system, current user of the computer system, current status of resources of the computer system, current response times of the computer system, and current running applications on the computer system.

4. The computer-implemented method of claim 1, further comprising:
   receiving, by the computer system, an indication that the computer-generated message corresponding to the computer system has been triggered by the event within the computer system; and
   generating, by the computer system, the set of modification layers related to the computer-generated message corresponding to the computer system based on the current user-system context in response to the computer-generated message being triggered.

5. The computer-implemented method of claim 4, further comprising:
   generating, by the computer system, the set of modification layers related to the computer-generated message corresponding to the computer system based on up-to-date input received from another user via a network.

6. The computer-implemented method of claim 5, further comprising:
   applying, by the computer system, the set of modification layers to the computer-generated message according to the hierarchy from a lowest modification layer to a highest modification layer of the hierarchy to form a personalized computer message for the user.

7. The computer-implemented method of claim 6, further comprising:
   applying, by the computer system, the set of modification layers to the computer-generated message according to a designated priority of a given modification layer in the hierarchy.

8. A computer system for modifying original computer-generated messages, the computer system comprising:
   a communication fabric;

a storage device connected to the communication fabric, wherein the storage device stores program instructions; and a processor connected to the communication fabric, wherein the processor executes the program instructions to:

generate a computer-generated message triggered by an event within the computer system during runtime regarding an issue with operation of the computer system;

detect a current user-system context of the computer system in relation to the issue with the operation of the computer system during runtime in response to generating the computer-generated message triggered by the event within the computer system;

identify the computer-generated message corresponding to the current user-system context of the computer system within a base layer of original computer-generated messages in the computer system using an identifier corresponding to the computer-generated message;

determine whether a set of modification layers corresponding to the current user-system context of the computer system exists in a hierarchy above the base layer of the original computer-generated messages;

select a modification layer that is a lowest modification layer of the set of modification layers in the hierarchy above the base layer to form a selected modification layer in response to the computer system determining that the set of modification layers corresponding to the current user-system context of the computer system does exist in the hierarchy above the base layer;

modify the computer-generated message by at least one of replacing text or appending text of the computer-generated message according to instructions located in a structure of the selected modification layer to form a modified computer-generated message corresponding to the current user-system context of the computer system; and output the modified computer-generated message corresponding to the current user-system context of the computer system to a user.

9. The computer system of claim 8, wherein the processor further executes the program instructions to:

output the computer-generated message to the user in response to the computer system determining that a set of modification layers corresponding to the current user-system context of the computer system does not exist in a hierarchy above the base layer.

10. The computer system of claim 8, wherein the processor further executes the program instructions to:

detect user-system context continuously, the user-system context comprising a plurality of user-specific information elements and a plurality of computer system-specific information elements, wherein the plurality of user-specific information elements includes preferred language of the user, role of the user when utilizing the computer system, assigned computer system permissions corresponding to the user, and list of recent computer system activities performed by the user, and wherein the plurality of computer system-specific information elements includes current overall load of the computer system, current user of the computer system, current status of resources of the computer system, current response times of the computer system, and current running applications on the computer system.

11. A computer program product for modifying original computer-generated messages, the computer program product comprising a computer-readable storage medium having program instructions embodied therewith, the program instructions executable by a computer system to cause the computer system to perform a method of:

generating, by the computer system, a computer-generated message triggered by an event within the computer system during runtime regarding an issue with operation of the computer system;

detecting, by the computer system, a current user-system context of the computer system in relation to the issue with the operation of the computer system during runtime in response to generating the computer-generated message triggered by the event within the computer system;

identifying, by the computer system, the computer-generated message corresponding to the current user-system context of the computer system within a base layer of original computer-generated messages in the computer system using an identifier corresponding to the computer-generated message;

determining, by the computer system, whether a set of modification layers corresponding to the current user-system context of the computer system exists in a hierarchy above the base layer of the original computer-generated messages;

selecting, by the computer system, a modification layer that is a lowest modification layer of the set of modification layers in the hierarchy above the base layer to form a selected modification layer in response to the computer system determining that the set of modification layers corresponding to the current user-system context of the computer system does exist in the hierarchy above the base layer;

modifying, by the computer system, the computer-generated message by at least one of replacing text or appending text of the computer-generated message according to instructions located in a structure of the selected modification layer to form a modified computer-generated message corresponding to the current user-system context of the computer system; and outputting, by the computer system, the modified computer-generated message corresponding to the current user-system context of the computer system to a user.

12. The computer program product of claim 11, further comprising:

outputting, by the computer system, the computer-generated message to the user in response to the computer system determining that a set of modification layers corresponding to the current user-system context of the computer system does not exist in a hierarchy above the base layer.

13. The computer program product of claim 11, further comprising:

detecting, by the computer system, user-system context continuously, the user-system context comprising a plurality of user-specific information elements and a plurality of computer system-specific information elements, wherein the plurality of user-specific information elements includes preferred language of the user, role of the user when utilizing the computer system, assigned computer system permissions corresponding to the user, and list of recent computer system activities performed by the user, and wherein the plurality of computer system-specific information elements includes current overall load of the computer system, current user of the computer system, current status of resources of the computer system, current response times of the computer system, and current running applications on the computer system.

14. The computer program product of claim 11, further comprising:
  receiving, by the computer system, an indication that the computer-generated message corresponding to the computer system has been triggered by the event within the computer system; and
  generating, by the computer system, the set of modification layers related to the computer-generated message corresponding to the computer system based on the current user-system context in response to the computer-generated message being triggered.

* * * * *